United States Patent
Higuchi et al.

(10) Patent No.: US 10,619,041 B2
(45) Date of Patent: Apr. 14, 2020

(54) PROPYLENE-BASED POLYMER COMPOSITION AND INJECTION-MOLDED PRODUCT MADE THEREOF

(71) Applicant: Sumitomo Chemical Company, Limited, Tokyo (JP)

(72) Inventors: Yu Higuchi, Ichihara (JP); Takeshi Maruyama, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 42 days.

(21) Appl. No.: 16/064,048

(22) PCT Filed: Dec. 20, 2016

(86) PCT No.: PCT/JP2016/087927
§ 371 (c)(1),
(2) Date: Jun. 20, 2018

(87) PCT Pub. No.: WO2017/110800
PCT Pub. Date: Jun. 29, 2017

(65) Prior Publication Data
US 2019/0002679 A1  Jan. 3, 2019

(30) Foreign Application Priority Data

Dec. 22, 2015 (JP) .................... 2015-249416

(51) Int. Cl.
| | | |
|---|---|---|
| *C08L 23/12* | (2006.01) | |
| *C08K 3/04* | (2006.01) | |
| *C08L 23/16* | (2006.01) | |
| *C08L 53/00* | (2006.01) | |
| *C08L 23/08* | (2006.01) | |

(52) U.S. Cl.
CPC ............. *C08L 23/12* (2013.01); *C08K 3/04* (2013.01); *C08L 23/08* (2013.01); *C08L 23/0815* (2013.01); *C08L 23/16* (2013.01); *C08L 53/00* (2013.01); *C08K 2201/005* (2013.01); *C08K 2201/006* (2013.01); *C08L 2207/02* (2013.01)

(58) Field of Classification Search
CPC ...... C08L 23/16; C08L 23/0915; C08L 23/08; C08L 23/12; C08L 53/08; C08L 2207/02; C08L 2201/006; C08L 2201/005; C08K 3/04; C08K 3/34
See application file for complete search history.

(56) References Cited

U.S. PATENT DOCUMENTS

2010/0078194 A1  4/2010  Bhatt et al.

FOREIGN PATENT DOCUMENTS

| EP | 1726619 A1 | 11/2006 |
|---|---|---|
| JP | S54113640 A | 9/1979 |
| JP | S58210938 A | 12/1983 |
| JP | 2006225418 A | 8/2006 |
| JP | 2010018744 A | 1/2010 |
| JP | 2010070749 A | 4/2010 |
| JP | 2012036247 A | 2/2012 |
| JP | 2013209472 A | 10/2013 |
| JP | 2014167056 A | 9/2014 |
| WO | 2008041965 A2 | 4/2008 |

OTHER PUBLICATIONS

International Preliminary Report on Patentabiility dated Jun. 26, 2018 in International Application No. PCT/JP2016/087927.
International Search Report dated Feb. 28, 2017 in International Application No. PCT/JP2016/087927.
Extended European Search Report dated May 9, 2019 in EP Application No. 16878689.5.

*Primary Examiner* — Nathan M Nutter
(74) *Attorney, Agent, or Firm* — Panitch Schwarze Belisario & Nadel LLP

(57) ABSTRACT

A propylene-based polymer composition having good thermal stability and yielding a molded product have a favorable appearance is provided. The composition contains a propylene-based polymer (A) selected from a propylene homopolymer (A-1) and a heterophasic propylene-based polymer (A-2), carbon black (D), and optionally ethylene-α-olefin copolymer (B). The content of (D) is 0.001 to 1.7 parts by weight with respect to 100 parts by weight of (A). The primary particle size of the carbon black is 15 nm to 39 nm, and x defined by the following formula (1) is 1 to 430.

$$x = a \times S \quad (1)$$

In formula (1), a is the concentration (unit: atom %) of oxygen double-bonded to carbon on the surface of the carbon black, and S is the nitrogen adsorption specific surface area (unit: m$^2$/g) of the carbon black.

11 Claims, No Drawings

PROPYLENE-BASED POLYMER COMPOSITION AND INJECTION-MOLDED PRODUCT MADE THEREOF

CROSS-REFERENCE TO RELATED APPLICATION

This application is a Section 371 of International Application No. PCT/JP2016/087927, filed Dec. 20, 2016, which was published in the Japanese language on Jun. 29, 2017 under International Publication No. WO 2017/110800 A1, which claims priority under 35 U.S.C. § 119(b) to Japanese Application No. 2015-249416, filed Dec. 22, 2015, the disclosures of which are incorporated herein by reference in their entirety.

TECHNICAL FIELD

The present invention relates to a propylene-based polymer composition and an injection-molded product made thereof.

BACKGROUND ART

Propylene-based polymers are used for home electronics parts, automobile parts and the like because of their excellent rigidity, impact strength and the like. The propylene-based polymer used for products requiring high class and design is usually colored by blending a pigment. In the case of blacking, carbon black is often used as a pigment. Streaky color unevenness sometimes occurs in an injection-molded product of a composition containing a propylene-based polymer and carbon black, and the following composition for the purpose of improving this drawback has been known.

Patent Document 1 describes a composition comprising a polypropylene-based resin as the main component, talc, an ethylene-butene copolymer elastomer, a modified polypropylene, erucic acid amide and carbon black.

PRIOR ART DOCUMENT

Patent Document

Patent Document 1: JP No. 2013-209472 A1

SUMMARY OF THE INVENTION

Problem to be Solved by the Invention

However, the above-described composition has insufficient thermal stability.

Under such circumstances, an object of the present invention is to provide a propylene-based polymer composition having good thermal stability and giving a molded product having good appearance when molded, and an injection-molded product being excellent in appearance and being made of the propylene-based polymer composition.

Means for Solving the Problem

In a first aspect, the present invention relates to a propylene-based polymer composition comprising a propylene-based polymer (A) which is at least one propylene-based polymer selected from the group consisting of a propylene homopolymer (A-1) and a heterophasic propylene-based polymer (A-2), and carbon black (D), wherein the content of the carbon black (D) is 0.001 part by weight or more and 1.7 parts by weight or less with respect to the total amount of the propylene-based polymer (A) being 100 parts by weight, the primary particle size of the carbon black (D) is 15 nm or more and 39 nm or less, and x defined by the following formula (1) is 1 or more and 430 or less:

$$x = a \times S \quad (1)$$

wherein, a is the concentration (unit: atom %) of oxygen double-bonded to carbon on the surface of the carbon black, and S is the nitrogen adsorption specific surface area (unit: $m^2/g$) of the carbon black.

In one embodiment, the carbon black (D) has a nitrogen adsorption specific surface area of 60 $m^2/g$ or more and 360 $m^2/g$ or less and the amount of a volatile component of 1.1% by weight or more and 10% by weight or less.

In one embodiment, the propylene-based polymer (A) comprises a propylene homopolymer (A-1) and a heterophasic propylene-based polymer (A-2), and the heterophasic propylene-based polymer (A-2) consists of a propylene homopolymer component (A-2-1) and a propylene-ethylene copolymer component (A-2-2) having an intrinsic viscosity of 2.0 dl/g or more and 10.0 dl/g or less.

In one embodiment, the propylene-based polymer composition further comprises an ethylene-α-olefin copolymer (B) which is at least one ethylene-α-olefin copolymer selected from the group consisting of an ethylene-α-olefin copolymer (B-1) having a monomer unit derived from ethylene and a monomer unit derived from an α-olefin having a number of carbon atoms of 4 or more and an ethylene-propylene copolymer (B-2), the content of the propylene-based polymer (A) is 86 parts by weight or more and 99 parts by weight or less, content of the ethylene-α-olefin copolymer (B) is 1 part by weight or more and 14 parts by weight or less and the content of the carbon black (D) is 0.001 part by weight or more and 1.5 parts by weight or less with respect to the total amount of the propylene-based polymer (A) and the ethylene-α-olefin copolymer (B) being 100 parts by weight, the content of the monomer unit derived from ethylene contained in the ethylene-α-olefin copolymer (B-1) is 40% by weight or more and 99% by weight or less with respect to the total amount of the ethylene-α-olefin copolymer (B-1) is 100% by weight, and the ethylene-propylene copolymer (B-2) has an intrinsic viscosity of 0.1 dl/g or more and less than 2.0 dl/g.

In a second aspect, the present invention relates to an injection-molded product comprising the propylene-based polymer composition.

Effect of the Invention

According to the present invention, it is possible to obtain a propylene-based polymer composition having good thermal stability and giving a molded product having good appearance when molded, and an injection-molded product excellent in appearance made thereof.

MODES FOR CARRYING OUT THE INVENTION

In the first aspect, the present invention is a propylene-based polymer composition comprising a propylene-based polymer (A) as at least one propylene-based polymer selected from the group consisting of a propylene homopolymer (A-1) and a heterophasic propylene-based polymer (A-2), and the carbon black (D), as described above.

The propylene-based polymer (A) is at least one propylene-based polymer selected from the group consisting of a propylene homopolymer (A-1) and a heterophasic propylene-based polymer (A-2).

The propylene-based polymer (A) is preferably a heterophasic propylene-based polymer (A-2) or a mixture of a heterophasic propylene-based polymer (A-2) and a propylene homopolymer (A-1), from the standpoints of rigidity and impact resistance.

The heterophasic propylene-based polymer (A-2) is a copolymer which is obtained by multistage polymerization and consists of a propylene homopolymer component (A-2-1) and a propylene-ethylene copolymer component (A-2-2). The propylene-ethylene copolymer component (A-2-2) is usually a propylene-ethylene random copolymer.

The molecular weight distribution of the propylene homopolymer component (A-2-1) is preferably 3 to 10, more preferably 3.0 to 10.0, still more preferably 3.5 to 9.0, from the standpoints of rigidity, impact resistance and moldability. The molecular weight distribution is defined as the ratio of the weight average molecular weight (Mw) to the number average molecular weight (Mn), that is, Mw/Mn, and the number average molecular weight and the weight average molecular weight are measured by gel permeation chromatography (hereinafter, described as GPC).

The isotactic pentad fraction of the propylene homopolymer component (A-2-1) measured by $^{13}$C-NMR is preferably 0.95 or more, more preferably 0.97 or more, from the standpoint of rigidity. The isotactic pentad fraction is measured by the method described in Macromolecules vol. 6, p. 925 (1973). The isotactic pentad fraction refers to an isotactic fraction in terms of pentad units that are continuous in the propylene polymer chain. In measurement by the $^{13}$C-NMR spectrum, the intensity fraction of the mmmm peak in the entire absorption peak in the methyl carbon region of the $^{13}$C-NMR spectrum is defined as the isotactic pentad fraction. The assignment of peaks in the NMR spectrum is based on the description in Macromolecules vol. 8, p. 687 (1975).

The intrinsic viscosity (hereinafter, referred to as $[\eta]_P$ in some cases) of the propylene homopolymer component (A-2-1) measured in a tetralin solution at a temperature of 135° C. is preferably from 0.7 to 1.5 dl/g, more preferably from 0.8 to 1.3 di/g, from the standpoint of moldability.

The intrinsic viscosity (hereinafter, referred to as $[\eta]_{EP}$ in some cases) of the propylene-ethylene copolymer component (A-2-2) measured in a tetralin solution at a temperature of 135° C. is preferably 2.0 dl/g or more and 1.0.0 dl/g or less, more preferably 2.1 dl/g or more and 8.0 dl/g or less, still more preferably 2.5 dl/g or more and 7.5 dl/g or less, from the standpoints of moldability and appearance.

The content $[(C2')_{EP}]$ of the monomer unit derived from ethylene contained in the propylene-ethylene copolymer component (A-2-2) is preferably 21 to 99% by weight, more preferably from 23 to 55% by weight, still more preferably from 25 to 45% by weight with respect to the total amount of the propylene-ethylene copolymer component (A-2-2) is 100% by weight %, from the standpoint of impact resistance.

The content of the propylene-ethylene copolymer component (A-2-2) contained in the heterophasic propylene-based polymer (A-2) is preferably 8 to 35% by weight with respect to the total amount of the heterophasic propylene-based polymer (A-2) is 100% by weight, from the standpoint of moldability.

The molecular weight distribution of the propylene homopolymer (A-1) is preferably 3 to 1.0, more preferably 3.5 to 9.0, from the standpoints of rigidity, impact resistance and moldability. The definition of the molecular weight distribution and the measuring method thereof are the same as described above.

The isotactic pentad fraction of the propylene homopolymer (A-1) measured by $^{13}$C-NMR is preferably 0.95 or more, more preferably 0.97 or more, from the standpoint of rigidity. The definition of the isotactic pentad fraction and the determination method thereof are the same as described above.

The intrinsic viscosity (hereinafter, referred to as $[\eta]$ in some cases) of the propylene homopolymer (A-1) measured in a tetralin solution at 135° C. is preferably 0.7 to 1.5 dl/g, more preferably 0.8 to 1.3 dl/g, from the standpoint of moldability.

The propylene-based polymer (A) can be produced by a method of polymerizing monomers using a stereoregular olefin polymerization catalyst. As the catalyst, known stereoregular olefin polymerization catalysts can be used. Examples thereof include a Ziegler-Natta catalyst system, a metallocene catalyst system and a catalyst system having a combination thereof. The polymerization method includes, for example, a bulk polymerization method, a solution polymerization method, a slurry polymerization method, a gas phase polymerization method and a polymerization method in which these polymerization methods are arbitrarily combined, and is preferably a continuous gas phase polymerization method. The polymerization conditions such as the polymerization temperature, the polymerization pressure, the monomer concentration, the catalyst loading amount and the polymerization time can be appropriately determined depending on the composition or structure of the intended propylene-based polymer (A).

The process for producing the heterophasic propylene-based polymer (A-2) is preferably multistage polymerization comprising a first step of homopolymerizing propylene in the presence of a stereoregular olefin polymerization catalyst to obtain a propylene homopolymer component (A-2-1) and a second step of copolymerizing ethylene and propylene in the presence of the propylene homopolymer component (A-2-1) to obtain a propylene-ethylene copolymer component (A-2-2), subsequently to the first step. The multistage polymerization is also referred to as polymerized polymer blend.

In one embodiment, the propylene-based polymer composition of the present invention contains an ethylene-α-olefin copolymer (B) in addition to the propylene-based polymer (A).

The ethylene-α-olefin copolymer (B) is at least one ethylene-α-olefin copolymer selected from the group consisting of an ethylene-α-olefin copolymer (B-1) having a monomer unit derived from ethylene and a monomer unit derived from an α-olefin having a number of carbon atoms of 4 or more and an ethylene-propylene copolymer (B-2).

The α-olefin having a number of carbon atoms of 4 or more in the ethylene-α-olefin copolymer (B-1) includes butene-1, pentene-1, hexene-1, heptene-1, octene-1 and decene, and is preferably an α-olefin having a number of carbon atoms of 4 or more and 8 or less such as butene-1, hexene-1 and octene-1. The ethylene-α-olefin copolymer (B-1) may be constituted of one kind of the α-olefin or two or more kinds of the α-olefins. The ethylene-α-olefin copolymer (B-1) is preferably a random copolymer.

The ethylene-α-olefin copolymer (B-1) includes an ethylene-butene-1 copolymer, an ethylene-hexene-1 copolymer and an ethylene-octene-1 copolymer, preferably an ethylene-octane-1 copolymer and an ethylene-butene-1 copolymer. The composition of the present invention may contain two or more kinds of the ethylene-α-olefin copolymers (B-1).

The content of the monomer unit derived from ethylene contained in the ethylene-α-olefin copolymer (B-1) is 40 to 99% by weight, preferably 50 to 90% by weight with respect to the total amount of the ethylene-α-olefin copolymer (B-1) is 100% by weight.

The molecular weight distribution (Mw/Mn) of the ethylene-α-olefin copolymer (B-1) is preferably 2.7 or less. The melt flow rate of the ethylene-α-olefin copolymer (B-1) (hereinafter, abbreviated as MFR in some cases; measured at a temperature of 190° C. under a load of 2.16 kgf according to JIS K 6758) is preferably 0.1 to 15 g/10 min.

The molecular weight distribution of the ethylene-octene-1 copolymer used as the ethylene-α-olefin copolymer (B-1) is preferably 2.5 or less, more preferably 2.3 or less, from the standpoint of mechanical properties.

The content of the monomer unit derived from octene-1 contained in the ethylene-octene-1 copolymer is preferably 15 to 45% by weight, more preferably 18 to 42% by weight with respect to the total amount of the ethylene-octene-1 copolymer is 100% by weight, from the standpoint of impact resistance.

The MFR measured at a temperature of 190° C. under a load of 2.16 kgf according to JIS K 6758 of the ethylene-octane-1 copolymer is preferably 0.5 to 15 g/10 min, more preferably 1 to 13 g/10 min, from the standpoints of moldability and impact resistance.

The molecular weight distribution of the ethylene-butene-1 copolymer is preferably 2.7 or less, more preferably 2.5 or less, from the standpoint of mechanical properties.

The content of the monomer unit derived from butene-1 contained in the ethylene-butene-1 copolymer is preferably 15 to 35% by weight, more preferably 17 to 33% by weight with respect to the total amount of the ethylene-butene-1 copolymer is 100% by weight, from the standpoint of impact resistance.

The MFR measured at 190° C. under a load of 2.16 kgf according to JIS K 6758 of the ethylene-butene-1 copolymer is preferably 0.5 to 15 g/10 min, more preferably 1 to 13 g/10 minutes, from the standpoints of impact resistance and moldability.

The molecular weight distribution of the ethylene-propylene copolymer (B-2) is preferably 2.7 or less, more preferably 2.5 or less, from the standpoint of mechanical properties.

The content of the monomer unit derived from ethylene contained in the ethylene-propylene copolymer (B-2) is preferably 1 to 20% by weight, more preferably 2 to 20% by weight, still more preferably 4 to 19% by weight with respect to the total amount of the ethylene-propylene copolymer is 100% by weight, from the standpoint of impact resistance. The intrinsic viscosity of the ethylene-propylene copolymer (B-2) is 0.1 dl/g or more and less than 2.0 dl/g, preferably 1.0 dl/g or more, preferably 1.9 dl/g or less, more preferably 1.8 dl/g or less, still more preferably 1.5 dl/g or less. The intrinsic viscosity is measured in a tetralin solution at a temperature of 135° C.

The MFR measured at 190° C. under a load of 2.16 kgf according to JIS K 6758 of the ethylene-propylene copolymer (B-2) is preferably 0.1 to 15 g/10 min, more preferably 1.0 to 13 g/10 min, from the standpoints of impact resistance and moldability.

The process for producing the ethylene-α-olefin copolymer (B) include a process for copolymerizing ethylene and at least one α-olefin using an olefin polymerization catalyst is mentioned. As the catalyst, known olefin polymerization catalysts can be used, and examples thereof include a catalyst system comprising a vanadium compound and an organoaluminum compound, a Ziegler-Natta catalyst system and a metallocene catalyst system. The polymerization method includes a solution polymerization method, a slurry polymerization method, a high pressure ion polymerization method and a gas phase polymerization method.

When the composition of the present invention contains the propylene-based polymer (A) and the ethylene-α-olefin copolymer (B), the content of the ethylene-α-olefin copolymer (B) contained in the composition of the present invention is from 1 to 14 parts by weight, preferably 3 to 13 parts by weight, more preferably 5 to 13 parts by weight with respect to the total amount of the propylene-based polymer (A) and the ethylene-α-olefin copolymer (B) is 100 parts by weight of the total amount of from the standpoint of the balance between rigidity and impact resistance.

The composition of the present invention may contain an inorganic filler (C). As the inorganic filler (C), those capable of improving the rigidity are preferable, and examples thereof include calcium carbonate, barium sulfate, mica, crystalline calcium silicate, talc, magnesium sulfate fiber and mixtures thereof. Preferably, it is talc, magnesium sulfate fiber, or a mixture thereof.

Talc is preferably one obtained by pulverizing hydrated magnesium silicate, from the standpoints of rigidity and heat resistance. The crystal structure of talc is a pyrophillite type three-layer structure, and the talc has a stack of this structure, particularly preferably a tabular form obtained by finely pulverizing crystals to approximately a unit layer.

The average particle size of talc is preferably 3 μm or less, from the standpoint of mechanical properties such as rigidity and impact resistance. The average particle size of talc denotes 50% equivalent particle size $D_{50}$ determined from an integral distribution curve measured by a sieve method with suspending talc in a dispersion medium which is water or alcohol using a centrifugal sedimentation type particle size distribution measuring apparatus.

In order to improve the interfacial adhesiveness with the propylene-based polymer (A) or to improve the dispersibility, the surface of talc may be treated with a silane coupling agent, a titanium coupling agent, a higher fatty acid, a higher fatty acid ester, a higher fatty acid amide, a higher fatty acid salt or a surface active agent.

The average fiber length of the magnesium sulfate fiber is preferably 5 to 50 μm, more preferably 10 to 30 μm, from the standpoint of mechanical properties such as rigidity and impact resistance.

The average fiber diameter of the magnesium sulfate fiber is preferably 0.3 to 2 μm, more preferably 0.5 to 1 μm, from the standpoint of mechanical properties such as rigidity and impact resistance.

The content of the inorganic filler (C) contained in the composition of the present invention is preferably 3 parts by weight or more, more preferably 6 parts by weight or more, still more preferably 19 parts by weight with respect to the total amount of the propylene-based polymer (A) is 100 parts by weight, from the standpoint of rigidity. The content of the inorganic filler (C) contained in the composition is preferably 44 parts by weight or less from the standpoints of impact strength and appearance. In addition, when the composition of the present invention contains the ethylene-α-olefin copolymer (B), the content of the inorganic filler (C) contained in the composition is preferably 3 parts by weight or more, more preferably 6 parts by weight or more, still more preferably 19 parts by weight or more with respect to the total amount of the propylene-based polymer (A) and the ethylene-α-olefin copolymer (B) is 100 parts by weight. The content of the inorganic filler (C) contained in the composition is preferably 38 parts by weight or less, from the standpoints of impact strength and appearance.

The pH of the carbon black (D) is preferably 2 to 8. The pH of the carbon black is measured according to the method described in JIS K 6221-1982. As the carbon black (D), a commercially available carbon black can be appropriately selected and used.

The primary particle size of the carbon black (D) is 15 nm or more and 39 nm or less, preferably 16 nm or more and 25 nm or less, more preferably 16 nm or more and 24 nm or less. In the present specification, the primary particle size of the carbon black means the average value of the diameters (the longest diameter in the case of non-spherical particles) of the carbon black primary particles present independently and/or the carbon black primary particles constituting a carbon black aggregate. The diameter of the carbon black primary particles is obtained by observation with an electron microscope, for example a transmission-type electron microscope.

The nitrogen adsorption specific surface area of the carbon black (D) is 60 m$^2$/g or more and 360 m$^2$/g or less, preferably 92 m$^2$/g or more and 260 m$^2$/g or less, more preferably 110 m$^2$/g or more and 260 m$^2$/g or less. The nitrogen adsorption specific surface area of the carbon black in the present specification is the total specific surface area calculated including also the area of the pore wall of the carbon black and is determined based on JIS K 6217.

The volatile component amount of the carbon black is 1.1% by weight or more and 10% by weight or less, preferably 1.5% by weight or more and 8% by weight or less, more preferably 1.5% by weight or more and 5% by weight or less. The volatile component of the carbon black in the present specification is a component generated by elimination of the surface functional group of the carbon black when the carbon black is placed in a crucible and heated at 950° C. for 7 minutes and includes CO, $CO_2$ and $H_2O$. The amount of the volatile component is calculated by substituting the weights of the carbon black before and after the heating into the following formula.

Volatile component amount (%)=100×(weight of the carbon black before heating−weight of the carbon black after heating)/weight of the carbon black before heating For the carbon black (D), x defined by the following formula (1) is 1 or more and 430 or less, preferably 20 or more and 430 or less, more preferably 43 or more and 101 or less, still more preferably 57 or more and 101 or less. The unit of x is (m$^2$·atom %/g);

$$x = a \times S \quad (1)$$

wherein, a is the concentration (unit: atom %) of oxygen double-bonded to carbon on the carbon black surface, and S is the nitrogen adsorption specific surface area (unit: m$^2$/g) of the carbon black.

x defined by the formula (1) represents the amount of oxygen double-bonded to carbon on the carbon black surface per unit weight of the carbon black. The oxygen concentration a is determined by the following method.

With respect to the carbon black, XPS spectra derived from the respective electron orbitals of C1s, O1s and S2p are measured by X-ray photoelectron spectroscopy (hereinafter, referred to as XPS). For the measurement of the XPS spectrum, for example, AXIS ULTRA DLD manufactured by KRATOS AN ALICYCAL is used, and for the analysis, for example, Vision Processing is used. As the X-ray source, A1K α ray (1486.6 eV) is used and the degree of vacuum in the apparatus is on the order of 10$^{-9}$ torr.

The concentration of the oxygen atom on the surface of the carbon black (hereinafter, referred to as surface oxygen concentration) is the ratio of the number of oxygen atoms on the surface of the carbon black to the total number of oxygen atoms, carbon atoms and sulfur atoms on the surface, and determined by the following method. Specifically, the peak areas of the respective spectra of C1s, O1s and S2p are measured, and the surface oxygen concentration is determined by the following formula using the relative sensitivity coefficients of 0.278 for C1s, 0.780 for O1s and 0.668 for S2p;

Surface oxygen concentration (atom %)=100×(c/0.780)/(b/0.278+c/0.780+d/0.668)

wherein, b is the total area of all peaks in the C1s spectrum, c is the total area of all peaks in the O1s spectrum, and d is the total area of all peaks in the S2p spectrum.

Next, the peak of the O1s spectrum is divided into four components: a peak derived from oxygen double-bonded to carbon (a peak having a peak top at about 531.0 eV), a peak derived from oxygen single-bonded to carbon having an sp3 orbit (a peak having a peak top at about 533.0 eV), a peak derived from oxygen single-bonded to carbon having an sp2 orbit (a peak having a peak top at about 535.0 eV) and a satellite peak by a process with π-π*transition (a peak having a peak top at about 537.5 eV), by peak fitting using the Gaussian function. The product of the ratio of the area of a peak derived from oxygen double-bonded to carbon to the c and the surface oxygen concentration (unit: atom %) is defined as a.

Chemical shift values of oxygen peaks in each structure is referred to the literature, J. M. PENA et al., Journal of Materials Science, 36 (2001) 2885.

The content of the carbon black (D) contained in the composition of the present invention is 0.001 part by weight or more and 1.7 parts by weight or less, preferably 0.005 parts by weight or more and 1.3 parts by weight or less, more preferably 0.005 parts by weight or more and 0.9 part by weight or less, with respect to 100 parts by weight of the propylene-based polymer (A). When the composition contains the propylene-based polymer (A) and the ethylene-α-olefin copolymer (B), the content of the carbon black (D) is 0.001 part by weight or more and 1.5 parts by weight or less, preferably 0.005 parts by weight or more and 1.1 parts by weight or less, more preferably 0.005 parts by weight or more and 0.8 parts by weight or less, with respect to 100 parts by weight of the total amount of the propylene-based polymer (A) and the ethylene-α-olefin copolymer (B).

The composition of the present invention may contain a pigment dispersant (E). As the pigment dispersant (E), preferred are lithium stearate, magnesium stearate, zinc stearate and polyethylene wax, more preferred are lithium stearate and zinc stearate, still more preferred is lithium stearate. One kind of the pigment dispersant (E) may be contained or two or more kinds of the pigment dispersants (E) may be contained in the composition.

The content of the pigment dispersant (E) contained in the composition is preferably 0.1 to 3.3 parts by weight, more preferably 0.2 to 1.2 parts by weight, still more preferably 0.2 to 0.9 parts by weight, with respect to 100 parts by weight of the propylene-based polymer (A). When the composition contains the propylene-based polymer (A) and the ethylene-α-olefin copolymer (B), the content of the pigment dispersant (E) is preferably from 0.1 to 2.8 parts by weight, more preferably from 0.2 to 1.0 part by weight, still more preferably 0.2 to 0.8 parts by weight, with respect to 100 parts by weight of the total amount of the propylene-based polymer (A) and the ethylene-α-olefin copolymer (B).

The process for producing the propylene-based polymer composition of the present invention includes a method of kneading the propylene-based polymer (A) and the carbon black (D), and if necessary, further the ethylene-α-olefin copolymer (B), the inorganic filler (C), the pigment dispersant (E) and the like using a kneader. The kneader includes a single screw extruder, a twin screw extruder, a Banbury mixer and a hot roll. The propylene-based polymer (A) and the carbon black (B), and if necessary, further the ethylene-α-olefin copolymer (B), the inorganic filler (C) and the pigment dispersant (E) may be supplied simultaneously to a kneader and kneaded, or may be divided and supplied to a kneader and kneaded.

The kneading temperature is usually 170 to 250° C., preferably 190 to 230° C. The kneading time is usually 1 to 20 minutes, preferably 3 to 15 minutes.

Into the propylene-based polymer composition of the present invention, additives may be further blended, if necessary, in addition to the components (A) to (E) and examples of such additives include antioxidants, ultraviolet absorbers, lubricants, pigments other than the carbon black, antistatic agents, copper damage inhibitors, flame retardants, neutralizing agents, foaming agents, plasticizers, nucleating agents, foam inhibitors and crosslinking agents.

The injection-molded product of the present invention is an injection-molded product comprising the propylene-based polymer composition of the present invention, and is produced by injection-molding the propylene-based polymer composition of the present invention. For injection molding, known injection molding methods can be applied.

The injection-molded product of the present invention is preferably an injection-molded product for automobiles, which is incorporated into an automobile as an automobile member. Examples of the automobile member constituted of the injection-molded product of the present invention include a door trim, a back door trim, a pillar, a glove box, a column cover, a bumper, a side molding, an instrument panel and a console.

EXAMPLES

The present invention will be illustrated with reference to examples and comparative examples below, but the present invention is not limited to these examples. The components used in the examples and comparative examples are shown below.

(1) Propylene-Based Polymer (A)

Heterophasic propylene-based polymer A heterophasic propylene-based polymer containing 77 parts by weight of (a) a propylene homopolymer component and parts by weight of (b) an ethylene-propylene random copolymer component which are described below, produced by a liquid phase-gas phase polymerization method using a polymerization catalyst prepared by the method described in Example 1 of JP-A No. 2004-182981

(a) Propylene Homopolymer Component:
Molecular weight distribution: 6.6
Isotactic pentad fraction: 0.98
Intrinsic viscosity: 1.2 dl/g (b) Ethylene-Propylene Random Copolymer:
Intrinsic viscosity: 3.7 dl/g
Content of monomer unit derived from ethylene: 30% by weight (2) Ethylene-α-Olefin Copolymer (B)
Engage EC 8200, manufactured by DuPont Dow Elastomer
Ethylene-octene-1 copolymer
Content of monomer unit derived from ethylene: 61.7% by weight
Content of monomer unit derived from octene-1: 38.3% by weight (3) Inorganic Filler (C)
Talc, manufactured by Hayashi Kasei Co., Ltd. 50%-equivalent particle size $D_{50}$=2.9 μm (4) Carbon Black (D)
Six kinds of carbon blacks D1 to D6 were used. The physical properties which are pH, primary particle size, nitrogen adsorption surface area and volatile component amount, of these carbon blacks, a in the above formula (1) and x defined by the above formula (1) are shown in the following Table 1.

TABLE 1

| Carbon black | pH | Primary particle size (nm) | Nitrogen adsorption surface area (m$^2$/g) | Amount of Volatile component (%) | Formula (1) a (atom %) | x (m$^2$ · atom %/g) |
|---|---|---|---|---|---|---|
| D1 | 2.5 | 13 | 460 | 20 | 2.5 | 1150 |
| D2 | 3.5 | 24 | 110 | 1.5 | 0.39 | 43 |
| D3 | 3 | 25 | 180 | 14 | 2.4 | 432 |
| D4 | 4.5 | 25 | 92 | 5 | 0.82 | 76 |
| D5 | 7.5 | 52 | 28 | 1.0 | 0.64 | 18 |
| D6 | 7.5 | 16 | 260 | 1.5 | 0.22 | 57 |

(5) Pigment Dispersant (E)
Lithium Stearate

The measurement methods of the physical properties of the polymer compositions used in Examples and Comparative Examples are described below.

(1) Thermal Stability (1-1) Evaluation Method

A gear oven life test was carried out using a test piece punched out from a press-molded product produced by the method described below. The test piece was put into a gear oven at 160° C. The test piece was taken out every 1 day and bent with a finger to check whether or not cracking occurred. When cracking occurred in the test piece by bending, the GOL test of the sample was terminated at that point, and the total time that the test piece was in the oven until this point was defined as gear oven life (hereinafter, referred to as GOL; unit is hour). The longer the GOL is, the better the thermal stability of the sample is.

(1-2) Production of Press-Molded Product

The press-molded product for evaluating the thermal stability was prepared according to the following method.

The composition was heated at 230° C. for 5 minutes at atmospheric pressure using a heat press machine and subsequently pressurized at 3 MPa for 5 minutes at 230° C. and further cooled at 5 MPa for 5 minutes at ambient temperature, to obtain a press-molded product which is a press sheet having a thickness of 1 mm. This sheet was punched out with a punching blade to obtain a disc-like test piece having a diameter of 25 mm and a thickness of 1 mm.

(2) Appearance

The appearance of a flat plate having a length of 100 mm, a width of 150 mm and a thickness of 3 mm molded by the following injection molding was visually observed and evaluated according to the following criteria.

Good: When the streaky color unevenness was not conspicuous in the molded product, the appearance was judged to be good and it was indicated by the symbol 0 in the following table.

Poor: When the streaky color unevenness was conspicuous in the molded product, the appearance was judged to be poor and it was indicated by the symbol x in the following table.

If necessary, specular gloss, which is one of indicators of appearance, was measured. The measurement was carried out at a measurement angle of 60° at the center of a disk-shaped test piece produced in the same manner as the method described in (1-2) above, using a specular gloss measuring device. The larger the specular gloss value is, the more glossily the surface of the molded product colors, and the better the gloss is.

[Production of Injection-Molded Product]

The injection-molded product for evaluating the appearance was produced according to the following method.

After thoroughly drying the composition with a hot air drier, injection molding was carried out at a molding temperature of 220° C., a mold cooling temperature of 50° C., an injection time of 10 seconds and a cooling time of 20 seconds using an SH100C type injection molding machine manufactured by Toshiba Machine Co., Ltd, to obtain an injection-molded product having a length of 100 mm, a width of 150 mm and a thickness of 3 mm.

Example 1

[Production of Propylene-Based Polymer Composition]

A propylene-based polymer composition was produced according to the following method.

Eighty eight parts by weight of a propylene-based polymer (A), 12 parts by weight of an ethylene-α-olefin copolymer (B), 27 parts by weight of an inorganic filler (C), 0.5 parts by weight of the carbon black (D1) and 0.4 part by weight of a pigment dispersant (E) were uniformly premixed with a tumbler, then, kneaded and extruded using an extruder, to produce a composition. The evaluation results of the composition are shown in Table 2.

Examples 2 to 3, Comparative Examples 1 to 3

A composition was produced in the same manner as in Example 1 except that the carbon black was changed to that shown in Table 2. The evaluation results of the composition are shown in Table 2.

Comparative Examples 5 to 6

A composition was produced in the same manner as in Example 1 except that each of the propylene-based polymer (A) and the ethylene-α-olefin copolymer (B) was changed as shown in Table 3. The evaluation results of the composition are shown in Table 3.

TABLE 2

| | Carbon black | GOL (hr) | Evaluation of appearance (color unevenness) |
|---|---|---|---|
| Comparative Example 1 | D1 | 20 | o |
| Example 1 | D2 | 89 | o |
| Comparative Example 2 | D3 | 46 | o |
| Example 2 | D4 | 86 | o |
| Comparative Example 3 | D5 | 185 | x |
| Example 3 | D6 | 109 | o |

TABLE 3

| | Carbon black | Propylene polymer (A) | Ethylene-α-olefin copolymer (B) | Evaluation of appearance (specular gloss) |
|---|---|---|---|---|
| Example 1 | D2 | 88 parts by weight | 12 parts by weight | 73 |
| Example 4 | D2 | 84 parts by weight | 16 parts by weight | 66 |
| Example 5 | D2 | 82 parts by weight | 20 parts by weight | 59 |

It is understood that Examples 1 to 3 are propylene-based polymer compositions satisfying the requirements of the present invention, and have good thermal stability and give molded products having good appearance when molded.

In contrast, the carbon black contained in the composition described in Comparative Example 1 does not satisfy the requirements of the present invention regarding the primary particle size, the nitrogen adsorption specific surface area, the volatile component amount and x defined by the formula (1), and the thermal stability of the composition was poor. The carbon black contained in the composition described in Comparative Example 2 does not satisfy the requirements of the present invention regarding the volatile component amount and x defined by the formula (1), and the thermal stability of the composition was poor. The carbon black contained in the composition described in Comparative Example 3 does not satisfy the requirements of the present invention regarding the primary particle size, the nitrogen adsorption specific surface area and the volatile component amount, and the appearance of the molded product composed of the composition was poor.

The amount of the ethylene-α-olefin copolymer contained in the compositions described in Examples 5 and 6 does not satisfy "the content of the ethylene-α-olefin copolymer (B) is 1 part by weight or more and 14 parts by weight or less" that is the requirement of the preferable embodiment of the present invention, and the specular gloss is lower as 6 compared with Example 1.

The invention claimed is:
1. A propylene-based polymer composition comprising a propylene-based polymer (A) which is at least one propylene-based polymer selected from the group consisting of a propylene homopolymer (A-1) and a heterophasic propylene-based polymer (A-2), and carbon black (D), wherein
the content of the carbon black (D) is 0.001 part by weight or more and 1.7 parts by weight or less with respect to the total amount of the propylene-based polymer (A) being 100 parts by weight,
the primary particle size of the carbon black (D) is 15 nm or more and 39 nm or less, and
x defined by the following formula (1) is 20 or more and 430 or less:

$$x = a \times S \quad (1)$$

wherein, a is the concentration (unit: atom %) of oxygen double-bonded to carbon on the surface of the carbon black, and S is the nitrogen adsorption specific surface area (unit: m²/g) of the carbon black.

2. The propylene-based polymer composition according to claim 1, wherein the carbon black (D) has a nitrogen adsorption specific surface area of 60 m²/g or more and 360 m²/g or less and the amount of a volatile component eliminated from the carbon black after heating in a crucible at 950° C. for 7 minutes is 1.1% by weight or more and 10% by weight or less relative to an initial weight of the carbon black before heating, wherein the volatile component of the carbon black is generated by elimination of surface functional groups from the carbon black by the heating.

3. The propylene-based polymer composition according to claim 1, wherein the propylene-based polymer (A) comprises a propylene homopolymer (A-1) and a heterophasic propylene-based polymer (A-2), and the heterophasic propylene-based polymer (A-2) consists of a propylene homopolymer component (A-2-1) and a propylene-ethylene copolymer component (A-2-2) having an intrinsic viscosity of 2.0 dl/g or more and 10.0 dl/g or less.

4. The propylene-based polymer composition according to claim 1, further comprising an ethylene-α-olefin copolymer (B) which is at least one ethylene-α-olefin copolymer selected from the group consisting of an ethylene-α-olefin copolymer (B-1) having a monomer unit derived from ethylene and a monomer unit derived from an α-olefin having a number of carbon atoms of 4 or more and 8 or less and an ethylene-propylene copolymer (B-2), wherein
the content of the propylene-based polymer (A) is 86 parts by weight or more and 99 parts by weight or less, the content of the ethylene-α-olefin copolymer (B) is 1 part by weight or more and 14 parts by weight or less and the content of the carbon black (D) is 0.001 part by weight or more and 1.5 parts by weight or less, with respect to the total amount of the propylene-based polymer (A) and the ethylene-α-olefin copolymer (B) being 100 parts by weight,
the content of the monomer unit derived from ethylene contained in the ethylene-α-olefin copolymer (B-1) is 40% by weight or more and 99% by weight or less with respect to the total amount of the ethylene-α-olefin copolymer (B-1) is 100% by weight,
and the ethylene-propylene copolymer (B-2) has an intrinsic viscosity of 0.1 dl/g or more and less than 2.0 dl/g.

5. An injection-molded product comprising the propylene-based polymer composition according to claim 1.

6. A propylene-based polymer composition comprising a propylene-based polymer (A) which is at least one propylene-based polymer selected from the group consisting of a propylene homopolymer (A-1) and a heterophasic propylene-based polymer (A-2), and carbon black (D), wherein
the content of the carbon black (D) is 0.001 part by weight or more and 1.7 parts by weight or less with respect to the total amount of the propylene-based polymer (A) being 100 parts by weight,
the primary particle size of the carbon black (D) is 15 nm or more and 39 nm or less, and
x defined by the following formula (1) is 1 or more and 430 or less:

$$x = a \times S \qquad (1)$$

wherein, a is the concentration (unit: atom %) of oxygen double-bonded to carbon on the surface of the carbon black, and S is the nitrogen adsorption specific surface area (unit: m²/g) of the carbon black, and wherein the carbon black (D) has a nitrogen adsorption specific surface area of 60 m²/g or more and 360 m²/g or less and the amount of a volatile component eliminated from the carbon black after heating in a crucible at 950° C. for 7 minutes is 1.1% by weight or more and 10% by weight or less relative to an initial weight of the carbon black before heating, wherein the volatile component of the carbon black is generated by elimination of surface functional groups from the carbon black by the heating.

7. A propylene-based polymer composition comprising a propylene-based polymer (A) which is at least one propylene-based polymer selected from the group consisting of a propylene homopolymer (A-1) and a heterophasic propylene-based polymer (A-2), and carbon black (D), wherein
the content of the carbon black (D) is 0.001 part by weight or more and 1.7 parts by weight or less with respect to the total amount of the propylene-based polymer (A) being 100 parts by weight,
the primary particle size of the carbon black (D) is 15 nm or more and 39 nm or less, and
x defined by the following formula (1) is 1 or more and 430 or less:

$$x = a \times S \qquad (1)$$

wherein, a is the concentration (unit: atom %) of oxygen double-bonded to carbon on the surface of the carbon black, and S is the nitrogen adsorption specific surface area (unit: m²/g) of the carbon black, and
wherein the propylene-based polymer (A) comprises a propylene homopolymer (A-1) and a heterophasic propylene-based polymer (A-2), and the heterophasic propylene-based polymer (A-2) consists of a propylene homopolymer component (A-2-1) and a propylene-ethylene copolymer component (A-2-2) having an intrinsic viscosity of 2.0 dl/g or more and 10.0 dl/g or less.

8. A propylene-based polymer composition comprising a propylene-based polymer (A) which is at least one propylene-based polymer selected from the group consisting of a propylene homopolymer (A-1) and a heterophasic propylene-based polymer (A-2), and carbon black (D), wherein
the content of the carbon black (D) is 0.001 part by weight or more and 1.7 parts by weight or less with respect to the total amount of the propylene-based polymer (A) being 100 parts by weight,
the primary particle size of the carbon black (D) is 15 nm or more and 39 nm or less, and
x defined by the following formula (1) is 1 or more and 430 or less:

$$x = a \times S \qquad (1)$$

wherein, a is the concentration (unit: atom %) of oxygen double-bonded to carbon on the surface of the carbon black, and S is the nitrogen adsorption specific surface area (unit: m²/g) of the carbon black,
wherein the composition further comprises an ethylene-α-olefin copolymer (B) which is at least one ethylene-α-olefin copolymer selected from the group consisting of an ethylene-α-olefin copolymer (B-1) having a monomer unit derived from ethylene and a monomer unit derived from an α-olefin having a number of carbon atoms of 4 or more and 8 or less and an ethylene-propylene copolymer (B-2), wherein
the content of the propylene-based polymer (A) is 86 parts by weight or more and 99 parts by weight or less, the content of the ethylene-α-olefin copolymer (B) is 1 part by weight or more and 14 parts by weight or less and the content of the carbon black (D) is 0.001 part by weight or more and 1.5 parts by weight or less, with respect to the total amount of the propylene-based polymer (A) and the ethylene-α-olefin copolymer (B) being 100 parts by weight, the content of the monomer unit derived from ethylene contained in the ethylene-α-olefin copolymer (B-1) is 40% by weight or more and 99% by weight or less with respect to the total amount of the ethylene-α-olefin copolymer (B-1) is 100% by weight, and the ethylene-propylene copolymer (B-2) has an intrinsic viscosity of 0.1 dl/g or more and less than 2.0 dl/g.

9. An injection-molded product comprising the propylene-based polymer composition according to claim 6.

10. An injection-molded product comprising the propylene-based polymer composition according to claim 7.

11. An injection-molded product comprising the propylene-based polymer composition according to claim 8.

* * * * *